United States Patent
Cheeniyil et al.

(10) Patent No.: US 6,990,664 B2
(45) Date of Patent: Jan. 24, 2006

(54) SYSTEM AND METHOD FOR MANAGING A WORKFLOW PROCESS

(75) Inventors: Lakshmi Kutty Cheeniyil, Bangalore (IN); Srivatsa Krishnaswamy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 928 days.

(21) Appl. No.: 09/839,003

(22) Filed: Apr. 20, 2001

(65) Prior Publication Data

US 2002/0184293 A1 Dec. 5, 2002

(51) Int. Cl.
*G06F 9/46* (2006.01)

(52) U.S. Cl. ........................................ 718/100; 718/103
(58) Field of Classification Search ................... 718/1, 718/100–108

See application file for complete search history.

(56) References Cited

U.S. PATENT DOCUMENTS 6,115,640 A * 9/2000 Tarumi ......................... 700/99
6,463,457 B1 * 10/2002 Armentrout et al. ......... 709/201

* cited by examiner

*Primary Examiner*—Meng-Al T. An

(57) ABSTRACT

A method is disclosed for managing a workflow process to bring execution time for said process at least closer to an expected deadline. The process includes a plurality of work nodes and a set of priority levels associated with each work node. The method includes the steps of: generating for each work node a set of expected time to complete (ETC) values for each priority level, each ETC value denoting a cumulative time to complete the process including the time taken by the corresponding node to complete its activity for a selected priority level; selecting for each work node a priority level that has a corresponding ETC value less than or equal to a remaining time available to meet said deadline; and executing activities associated with said work nodes in accordance with said selected priority levels to substantially meet said expected deadline.

8 Claims, 3 Drawing Sheets

SYSTEM AND METHOD FOR MANAGING A WORKFLOW PROCESS

BACKGROUND OF THE INVENTION

The present invention relates to the field of workflow process management. More particularly the invention relates to a system and method for expediting execution of a process which has been delayed to bring execution time of the process closer to an expected value.

In a workflow world, there are process definitions and actual instances of these definitions called process instances or simply processes. These instances may be 'enacted' by a Process Engine (PE) which is part of any workflow manager. When a workflow process is instantiated there may be a requirement to complete (or at least make an effort to complete) the process according to a deadline that is set when the process starts. This deadline can be due either to business goals or to real life requirements. Workflow processes may involve coordinated execution of activities performed by workflow resources (e.g., a participant, a computer-based application, or an instrument). A workflow process may include a number of steps called work nodes and some decision making nodes. Activities may be initiated in work nodes and executed by participants which are also known as Business Objects (BOs). A process may be delayed because of delays caused while performing activities. The delays may in turn depend on data set in the process, data set in BOs, time of start of an activity, load on a BO etc. The process engine itself may not cause delays except under heavy load conditions and relatively small process instance lifetimes.

The present invention proposes a solution based on historical data to expedite execution of a process which becomes delayed. The proposed scheme may cause one or more work nodes in the workflow process to change its/their priority/priorities dynamically to bring the execution time of an entire process to be within a deadline or at least closer to an expected value. The historical data collected from completed process instances corresponding to a process definition can be used as a basis for estimating values for Expected Time to Complete (ETC) for any new process instance at any work node during its execution. Typically these time values are dependent on priorities with which the activities are executed. If a process is entering a node, then an ETC value T associated with that node would indicate that, the rest of the process is expected to take a time T to complete execution.

'Priority based scheduling' is performed in the PE to meet the deadline. Work nodes with higher priority are executed faster than work nodes with lower priority. Route nodes do not take time to execute and therefore do not have priorities. It will be assumed herein that participants/BOs in a process are able to execute activities with different priorities as requested by the PE.

Work nodes request Business Objects to execute activities. These BOs can execute activities at different priorities resulting in different execution times. The cumulative time from all work nodes encountered from current node onwards till the process completes is reflected in the value of an ETC at the current node. This is why the ETC at any node is lowest for the highest priority.

An ability to predict process completion times accurately may enable business to save costs, utilize their resources more effectively and make commitments to their customers. In a managed workflow process, delaying activities may be identified and appropriate solutions applied to accelerate them. As a by-product, performance data collected while executing process instances may be used for capacity planning, tuning performance and identifying bottlenecks in a workflow process.

As described above a typical workflow process includes a number of steps called work nodes and some route nodes for making decisions. Referring to FIG. 1, activities initiated in the work nodes are executed by BOs 10, 11, 12. Processes or process instances are defined by a user in Process Definer module 13. Processes are defined in a language developed by Hewlett Packard (HP) called HPPM Process Definition Language (PDL). A Process Engine module 14 enables a user to launch an instance of a process from a process definition. A PDL can be loaded and unloaded from the Process Engine module (PE). Resource Executive module 21 takes resource assignment requests from the PE and assigns resources to activities. Process Monitoring module 15 makes available information about the status of active process instances as well as the history of completed process instances. Auditing module 16 produces a log of audit information which is stored in Audit Trail 17. Data items of each process execution are stored in workflow process database management system (DBMS) 18. Database Manager module 19 provides an interface between Process Engine module 14 and database 18. CORBA (Common Object Request Broker Architecture) message bus 20 provides a common message bus between process engine module 14 and BOs 10, 11, 12. PE module 14 sends an Activity Handle (AH) message to a BO to request the BO to execute an activity, being a piece of work performed by the BO. The BO sends an Activity Handle Reply (AHR) message to PE module 14 after completing execution of the activity.

SUMMARY OF THE INVENTION

According to one aspect of the present invention there is provided a method for managing a workflow process to bring execution time for said process at least closer to an expected deadline, said process including a plurality of work nodes and a set of priority levels associated with each work node, said method including the steps of:

generating for each work node a set of expected time to complete (ETC) values for each priority level, each ETC value denoting a cumulative time to complete the process including the time taken by the corresponding node to complete its activity for a selected priority level;

selecting for each work node a priority level that has a corresponding ETC value less than or equal to a remaining time available to meet said deadline; and executing activities associated with said work nodes in accordance with said selected priority levels to substantially meet said expected deadline.

According to a further aspect of the present invention there is provided a system for managing a workflow process to bring execution time for said process at least closer to an expected deadline, said process including a plurality of work nodes and a set of priority levels associated with each work node, said system including:

means for generating for each work node a set of expected time to complete (ETC) values for each priority level, each ETC value denoting a cumulative time to complete the process including the time taken by the corresponding node to complete its activity for a selected priority level;

means for selecting for each work node a priority level that has a corresponding ETC value less than or equal to a remaining time available to meet said deadline; and means for executing activities associated with said work nodes in accordance with said selected priority levels such that said expected deadline is substantially met with a high probability.

DESCRIPTION OF A PREFERRED EMBODIMENT

A preferred embodiment of the present invention will now be described with reference to the accompanying drawings. In the drawings.

Figure 2:
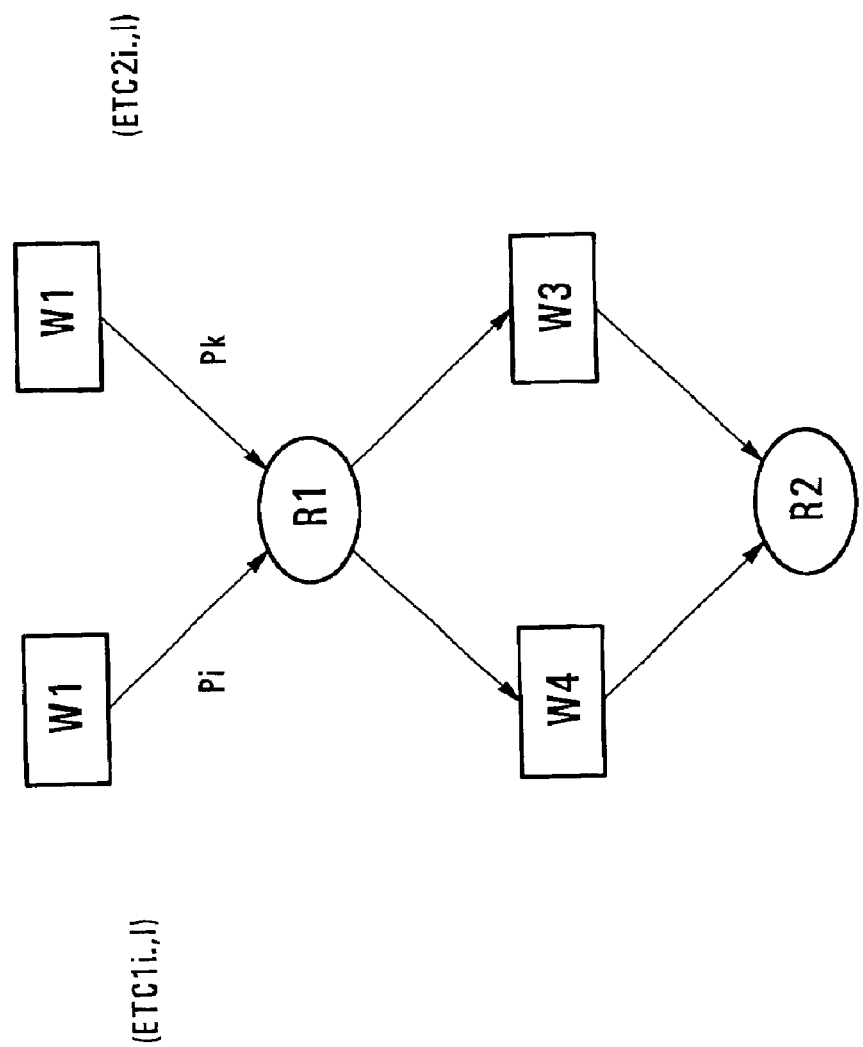
FIG. 2 shows a part of a workflow process definition including work nodes W1, W2, W3, W4 and route nodes R1, R2.
Figure 3:
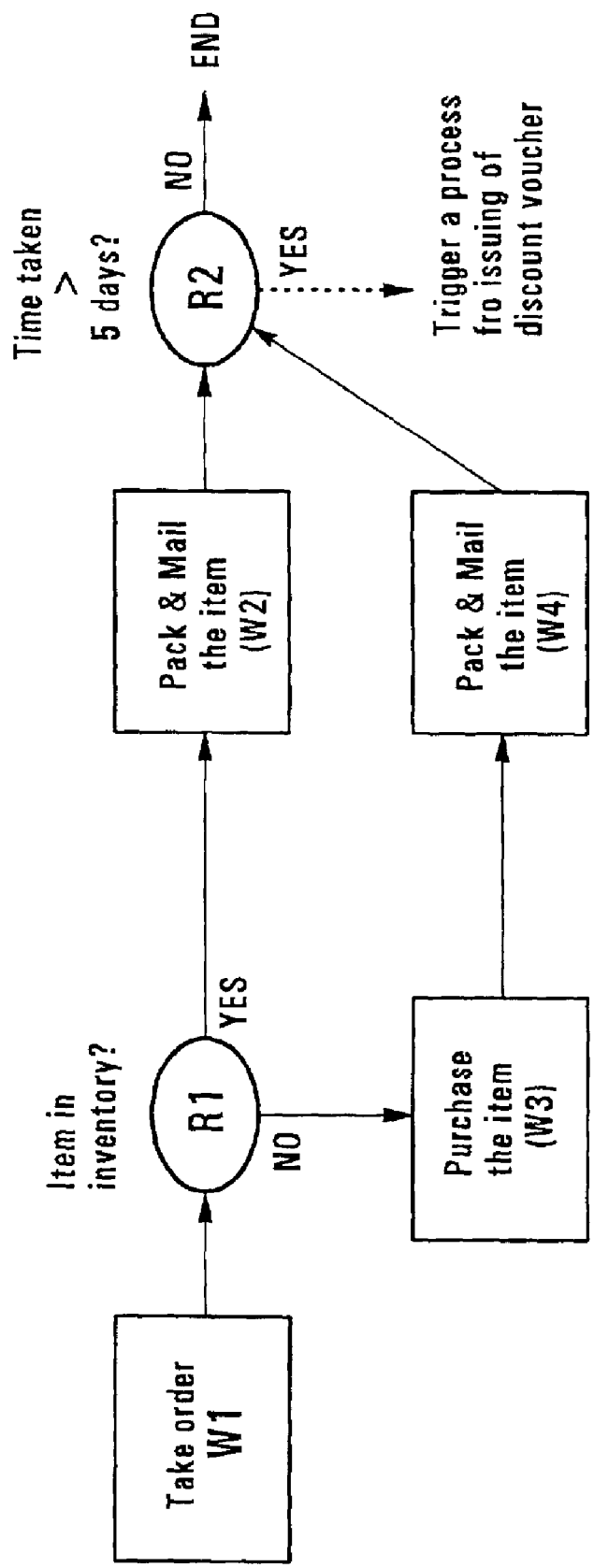
FIG. 3 shows a simplified on line shopping portal workflow process.

In FIG. 2, Wn denotes a work node and Rn denotes a route node. $P_S=\{P_i, P_j, P_k, P_l\}$ is a priority set for activities (work nodes) in the process definition. $P_i<P_j<P_k<P_l$ meaning that $P_i$ is the lowest priority and $P_l$ is the highest priority. ETC values are maintained for every priority level in $P_s$. Assume that the ETC set, statistically generated for W1 and W2 is $S1=\{ETC1_i, ETC1_j, ETC1_k, ETC1_l\}$ and $S2=\{ETC2_i, ETC2_j, ETC2_k, ETC2_l\}$ respectively, for the corresponding priority set $P_s$. Any $ETC_i$ value for a node also includes the time taken to execute the activity associated with the node with priority $P_i$. With priorities ordered as above it follows that $ETC1_i>ETC1_j>ETC1_k>ETC1_l$ for the set stored in node W1. Similarly $ETC2_i>ETC2_j>ETC2_k>ETC2_l$ for the set stored in node W2.

Assume that 'dl' denotes the time value set as the deadline for the process and that it is specified in absolute terms, eg. dl=5 days Also assume that node W2 is active. The remaining time for executing the process is dl—now. This value is mapped to the nearest ETC value in S2. Let it be $ETC_k$ which corresponds to a priority $P_k$ for the activity to be executed at W2. The BO that executes this activity is requested to do so at priority $P_k$ by W2. Similarly for node W1 there may be a different priority $P_j$. The above logic is applied to the remaining nodes, W3 and W4 as and when they are executed.

An example of the present invention will now be described with reference to an on-line shopping portal process. Referring to FIG. 5, W1 W2, W3 and W4 are work nodes where activities are performed. R1 & R2 are route/decision nodes where decisions are made. Work node W1 is the activity instance 'take order', work nodes W2 and W4 are the activity instances 'pack and mail the item' and work node W3 is the activity instance 'purchase the item'. Route node R1 relates to the decision "is the item in inventory"? and route node R2 relates to the decision "is the time taken more than 5 days?"

Figure 1:
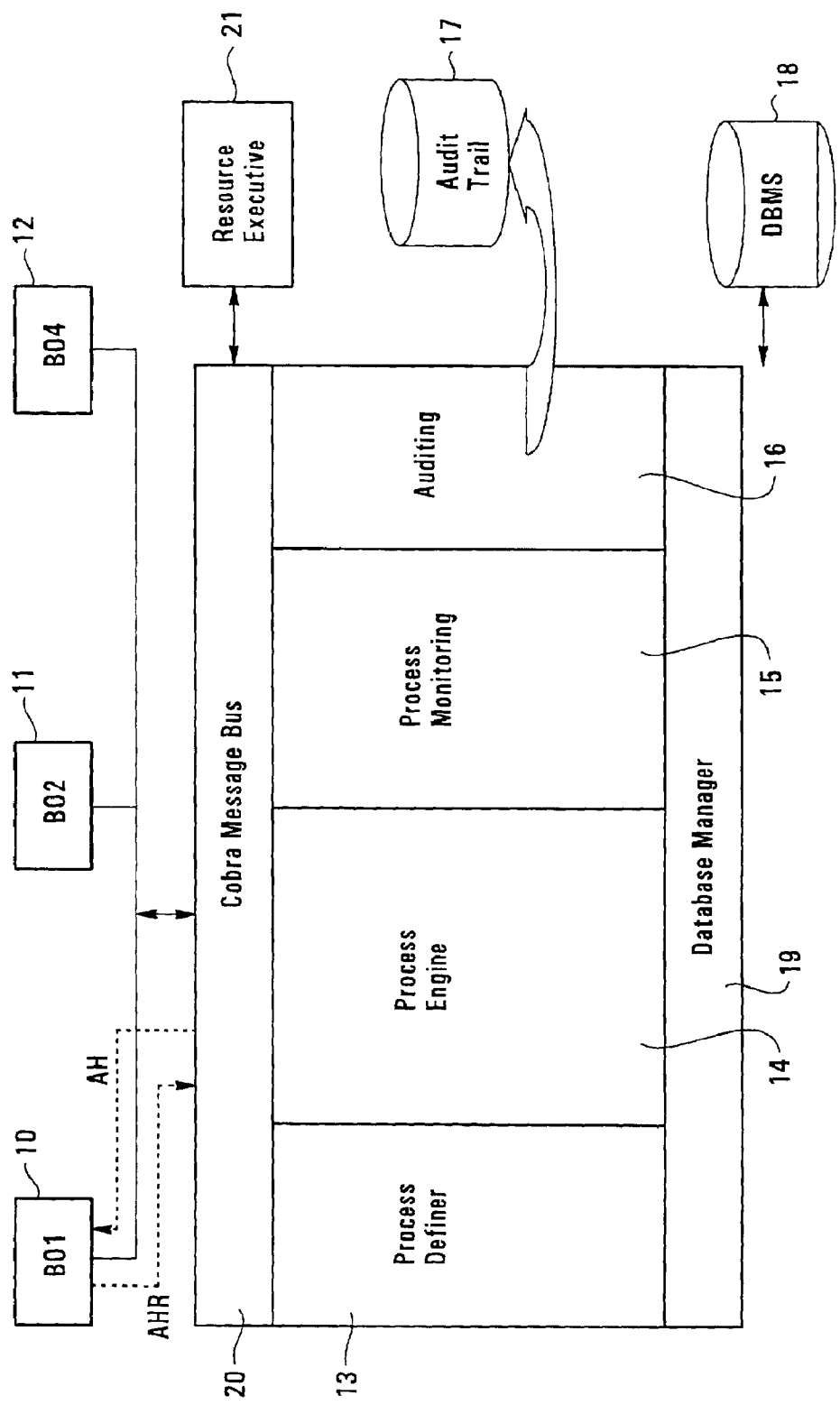
FIG. 1 is an overview of a process manager suitable for managing a workflow process to which the present invention may be applied.

As seen in FIG. 1, there is an audit trail maintained which logs a complete execution history of each and every process instance executed. For every process instance items such as, time when a work node was visited, the priority chosen for executing an associated activity, time when a process instance was completed etc., may be logged. For any one process instance, the time taken to complete from a work node onwards is the difference: time when process completed—time when node was visited. Such data samples are collected from many process instances of the same definition which are run with a fixed priority during a learning phase. The mean $\eta_p$ and standard deviation $\sigma_p$ are computed offline using elementary formulae known from probability theory.

$ETC_p$ is calculated using the formula $$ETC_p = \eta_p + 2\sigma_p$$

The $ETC_p$ so generated is stored in a separate table in the database manager module and is used by the process engine at the time of process execution as described herein.

ETC calculations may be updated periodically even after the learning phase.

Given below is a table of ETC values generated for different priorities (HIGH, MEDIUM and LOW).

In the above example it will be assumed that the instance will take the path W1-R1-W3-W4-R2.

| Description | ETC for HIGH priority ($\eta_{hi} + 2\sigma_{hi}$) | ETC for MEDIUM Priority ($\eta_{med} + 2\sigma_{med}$) | ETC for LOW Priority ($\eta_{low} + 2\sigma_{low}$) |
| --- | --- | --- | --- |
| W1 | 3 days | 6 days | 8 days |
| W3 | 2 days | 4 days | 5 days |
| W4 | 1 day | 1.5 days | 2 days |

The different priorities that each node would execute with are as follows,

| Description | Remaining time to meet deadline | Priority selected dynamically |
| --- | --- | --- |
| W1 | 5 | HIGH |
| W3 | 4 | MEDIUM |
| W4 | 1.5 | MEDIUM |

ETC selection rule for a work node is as follows:

Let t-avail be the time available to complete the process to meet a set deadline. If deadline and 'current time' are absolute time values then t-avail=(deadline−current time). At a given work node, select the priority that has an ETC value less than or equal to t-avail and is also closest to t-avail.

The process is instantiated with a deadline of 5 days, so on entry to W1 a priority=HIGH has to be chosen since the corresponding ETC(W1) of 3 days is the best choice to meet the deadline as per the above rule. Assume that W1 takes 1 day to execute its associated activity. Now when node W3 is entered the time left for the process to complete is 4 days. Since there are 4 more days to complete when the enactment reaches node W3, the process instance's priority can be decreased to MEDIUM. Similarly for node W4.

It is the responsibility of the BO to execute an activity with the priority determined by the process engine.

For a process definition ETCs are computed in 2 phases. During a first phase (also known as a 'Learning Phase'), an ensemble of process instances are run with an arbitrarily chosen but fixed priority for each instance. This means that all activities of a process are run with a priority set at the beginning of the process. Time stamps are logged whenever a work node is entered and also when the process terminates.

For a sample process, time available for the rest of the process to complete at a work node=process termination time (absolute)−time when the node was entered. From these time values for processes of same definition and a given priority, the 'mean' $\eta$ and 'standard deviation' $\sigma$ are calculated and ETC is computed using the formula, $\eta+2\sigma$. During the initial phase no commitment can be made with respect to deadline and only serves as a phase for collection of samples. The sets of ETC values form the basis or a seed for future use and updates of ETC values.

Subsequently when processes are run using the ETCs computed during the first phase, priorities at different nodes are allowed to change as described above so long as a given deadline is met for the process. Using these values, ETCs are updated to reflect real world situations allowing resource utilization to be more meaningful and cost effective for the business under consideration. Once the ETC values stabilize, updates may be only infrequently required such as when capacity changes in an organization take place.

Finally, it is to be understood that various alterations, modifications and/or additions may be introduced into the constructions and arrangements of parts previously described without departing from the spirit or ambit of the invention.

What is claimed is:

1. A method for managing a workflow process to bring execution time for said process at least closer to an expected deadline, said process including a plurality of work nodes and a set of priority levels associated with each work node, said method including the steps of:

generating for each work node a set of expected time to complete (ETC) values for each priority level, each ETC value denoting a cumulative time to complete the process including the time taken by the corresponding node to complete its activity for a selected priority level, wherein said ETC values are generated using formula ETC=$\eta+2\sigma$ and wherein $\eta$ is a statistical mean and a is a statistical standard deviation of values collected during a learning phase;

selecting for each work node a priority level that has a corresponding ETC value less than or equal to a remaining time available to meet said expected deadline; and executing activities associated with said work nodes in accordance with said selected priority levels, thereby brining execution time for said process at least closer to said expected deadline.

2. A method according to claim 1 wherein each priority level is selected so that the difference between said deadline and the ETC value is a minimum.

3. A method according to claim 1 wherein said ETC values are generated from historical data collected from completed process instances during a learning phase.

4. A method according to claim 1 wherein said executing is performed by at least one business object.

5. A system for managing a workflow process to bring execution time for said process at least closer to an expected deadline, said process including a plurality of work nodes and a set of priority levels associated with each work node, said system including:

means for generating for each work node a set of expected time to complete (ETC) values for each priority level, each ETC value including a time taken by the corresponding node to complete its activity for a selected priority level, wherein said ETC values are generated using the formula ETC=$\eta+2\sigma$ a and wherein i is a statistical mean and a is a statistical standard deviation of values collected during a learning phase;

means for selecting for each work node a priority level that has a corresponding ETC value less than or equal to a remaining time available to meet said expected deadline; and means for executing activities associated with said work nodes in accordance with said selected priority levels, thereby bringing execution time for said process at least closer to said expected deadline.

6. A system according to claim 5 wherein each priority level is selected so that the difference between said deadline and the ETC value is a minimum.

7. A system according to claim 5 wherein said ETC values are generated from historical data collected from completed process instances during a learning phase.

8. A system according to claim 5 wherein said means for executing includes at least one business object.

* * * * *